April 5, 1938.  F. WHITTLE  2,113,102
ELECTRICAL TORQUE TRANSMISSION
Filed Nov. 17, 1936
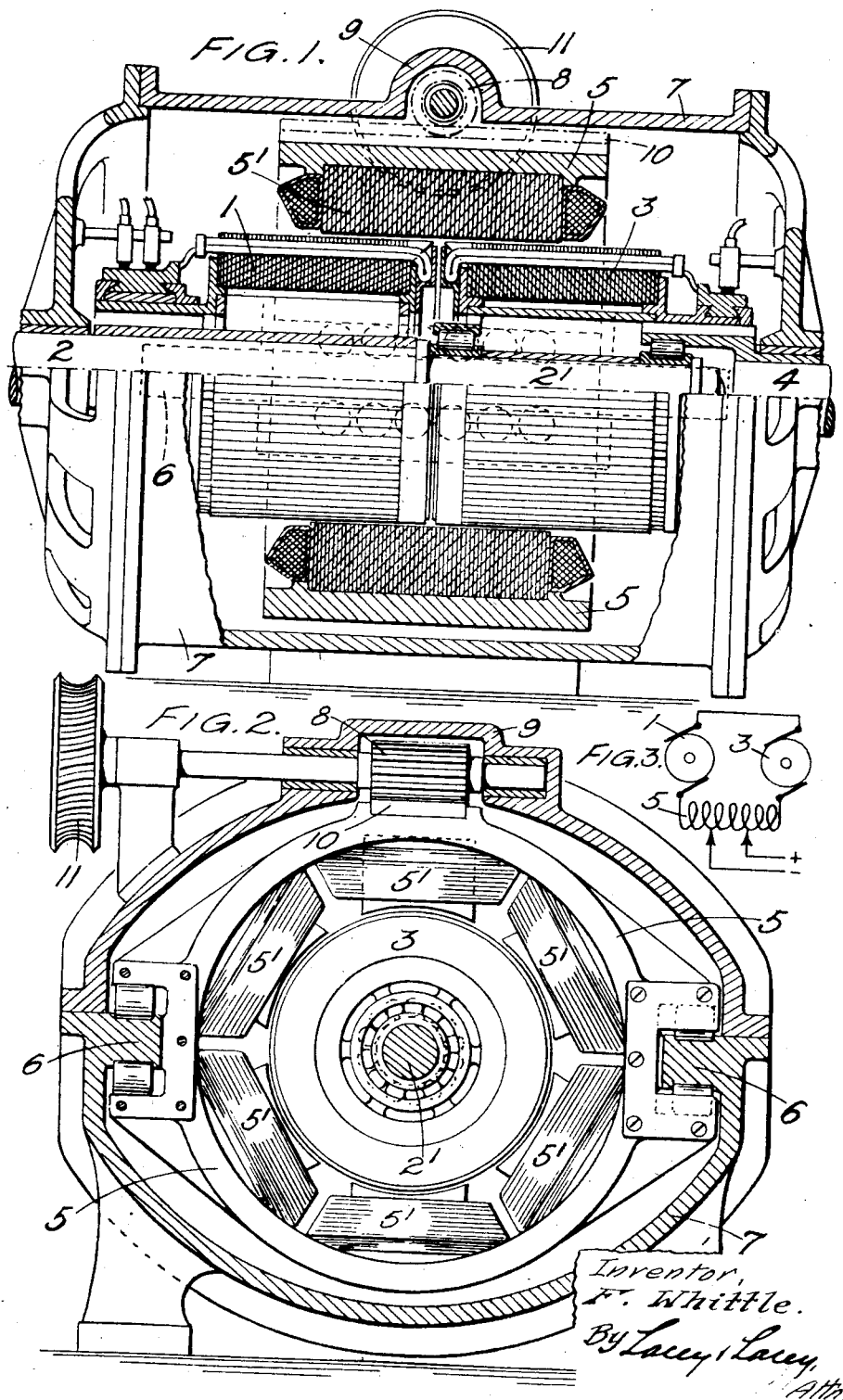
Inventor,
F. Whittle.
By Lacey & Lacey,
Attys.

Patented Apr. 5, 1938

2,113,102

UNITED STATES PATENT OFFICE 2,113,102

ELECTRICAL TORQUE TRANSMISSION

Frank Whittle, Trumpington, England

Application November 17, 1936, Serial No. 111,277
In Great Britain May 9, 1935

4 Claims. (Cl. 172—239)

This invention is concerned with a system for the electric transmission of power of the kind in which mechanical energy is first converted into electrical energy by an electric generator and this electrical energy is reconverted into mechanical energy by an electric motor.

In such a transmission system, according to the present invention in its broad aspect the flux passing through the armatures of the generator and motor is derived from a single field system; and the two armatures, which are relatively rotatable, are immovable with respect to one another in the axial direction, and as a pair are made capable of movement relative to the field so as to vary the ratio of the flux in the generator armature to that in the motor armature. Preferably the armatures are stationary (axially) in the machine, and the field moves axially. There may thus be obtained a variation in the ratio of the speeds of the generator and motor shafts, that is to say between the driving and driven shafts, accompanied by a variation in the ratio of the torques in those shafts, or a variation in both speed and torque in one or both shafts.

The form of my transmission gear which I at present prefer is illustrated diagrammatically in the accompanying drawing, Figures 1 and 2 of which are longitudinal and transverse sections respectively while Figure 3 is a diagram of connections.

1 is a direct-current generator armature which is mounted on the driving shaft 2. 3 is the direct-current motor armature which drives the driven shaft 4 and is coaxial with, and end-on and close to the generator armature 1, being in fact mounted on roller bearings on an extension 2' of the driving shaft 2. 5 denotes the common field structure the poles of which are indicated by 5'. The field windings and the windings of the two armatures are all connected in series as shown diagrammatically in Figure 3. The field structure 5 is mounted on rollers running on longitudinal rails 6 on the inside of the external casing 7, so that the field structure 5 can be moved backwards and forwards axially. Movement is effected by means of a pinion 8, accommodated in a recess 9 in the top of the casing 7, and a rack 10 on the top of the field structure 5. A worm wheel 11 is mounted on the shaft of pinion 8 to which movement is imparted by a worm (not shown) as described below. It will be clear that when the field structure is in the extreme left hand position substantially all its flux will pass through the generator armature 1 while when it is in the extreme right hand position it will nearly all pass through the motor armature 2; and that as it is moved the flux in one armature continuously increases while that in the other simultaneously continuously decreases. The windings being all connected in series, the current in all the windings is the same and, assuming no losses the ratio of the speeds of the driven and driving shafts is the inverse of the ratio of the two fluxes or the ratio of the torques in these two shafts is the same as the ratio of the two fluxes.

It is to be understood that the transmission system just described with reference to the drawing is given by way of example only and that in the first place its general construction could be varied considerably without departing from the scope of the invention, provided that there is a single field structure from which the flux for the two armatures is derived and that relative movement can be effected between the field and the two armatures so as to vary the ratio of the fluxes passing through the armatures.

The transmission system according to the present invention is of general application but it is particularly intended for use in power-driven vehicles or in transmitting the drive to machine tools, cranes, winches or mills. In the former application it is possible that the motor armature may sometimes overrun the generator armature, for example when the vehicle is coasting down a hill, to such an extent that all the residual magnetism in the magnetic circuit is destroyed.

What I claim is:—

1. In an electric torque-transmission system, an external casing having longitudinal rails on its interior, a generator armature in the casing and having a driving shaft provided with an extension, said driving shaft being journaled by the external casing, a motor armature in the casing and having a driven shaft independently rotatable on said driving shaft, a field structure in the casing surrounding both armatures and being common thereto, rollers connecting the field structure with the rails and slidably mounting said field structure within the casing, and means carried by the casing and adapted for shifting the field structure relative to the armatures for increasing the ratio of the speeds of the two shafts with decreasing ratios of the respective magnetic fluxes.

2. A device of the class described in accordance with claim 1, wherein the last mentioned means comprises a rack carried by the field structure and a meshing pinion rotatable on a shaft journaled in the upper end of the casing, said shaft being adapted to be rotated by an external source.

3. In an electric torque transmission, an external casing having rails therein, a generator armature in the casing and having a driving shaft journaled by the casing, a motor armature in the casing and having a driven shaft independently rotatable with respect to the driving shaft, a field structure in the casing and surrounding the armatures and being common thereto, means slidably mounting the field structure on the rails within the casing, and means carried by the casing and adapted for shifting the field structure relative to the armature for increasing the ratio of the speeds of the two shafts with decreasing ratios of the respective magnetic fluxes.

4. In an electric torque transmission, an external casing having rails therein, a generator armature rotatably mounted in the casing, a motor armature rotatably mounted in the casing and being rotatable with respect to the generator armature, a field structure in the casing and surrounding the armatures, means connecting the field structure with the rails whereby said field structure will be longitudinally shifted within the casing, and means carried by the casing and operable for shifting the field structure longitudinally of the casing and relative to the armatures for increasing the ratio of the speeds of the two shafts with decreasing ratios of the respective magnetic fluxes.

FRANK WHITTLE.